April 17, 1951     A. F. JELINEK     2,548,978
COLLET ASSEMBLY

Filed June 1, 1948     2 Sheets-Sheet 1

*INVENTOR.*
ALFRED F. JELINEK.
BY
Toulmin & Toulmin
ATTORNEYS

April 17, 1951     A. F. JELINEK     2,548,978
COLLET ASSEMBLY
Filed June 1, 1948

INVENTOR.
ALFRED F. JELINEK.
BY
Toulmin & Toulmin
ATTORNEYS

Patented Apr. 17, 1951

2,548,978

UNITED STATES PATENT OFFICE 2,548,978

COLLET ASSEMBLY

Alfred F. Jelinek, Cincinnati, Ohio, assignor to Cleveland Automatic Machine Co., Cincinnati, Ohio, a corporation of Ohio Application June 1, 1948, Serial No. 30,362

3 Claims. (Cl. 279—46)

This invention pertains to improvements in collet chucks for machine tools, and is particularly directed to improved mounting means for the work engaging chuck pads in the collet chuck.

One of the objects of this invention is to provide a mounting means for the pads of a collet chuck which avoids the necessity of axially withdrawing the collet from the tapered bore of the work spindle to change the chuck pads.

Another object of this invention is to provide an improved chuck pad mounting means accessible from the outside face of the collet without axial removal of the collet and which is simple in operation and requires a minimum of effort and skill upon the part of the operator to change the chuck pads.

It is also an object of this invention to provide an improved chuck pad mounting in a collet chuck so arranged that a minimum of highly accurate machining and dimensional control is required in manufacturing the parts comprising the chuck pad holding means.

Further features and advantages of this invention will appear from a detailed description of the drawings in which.

Figure 1:
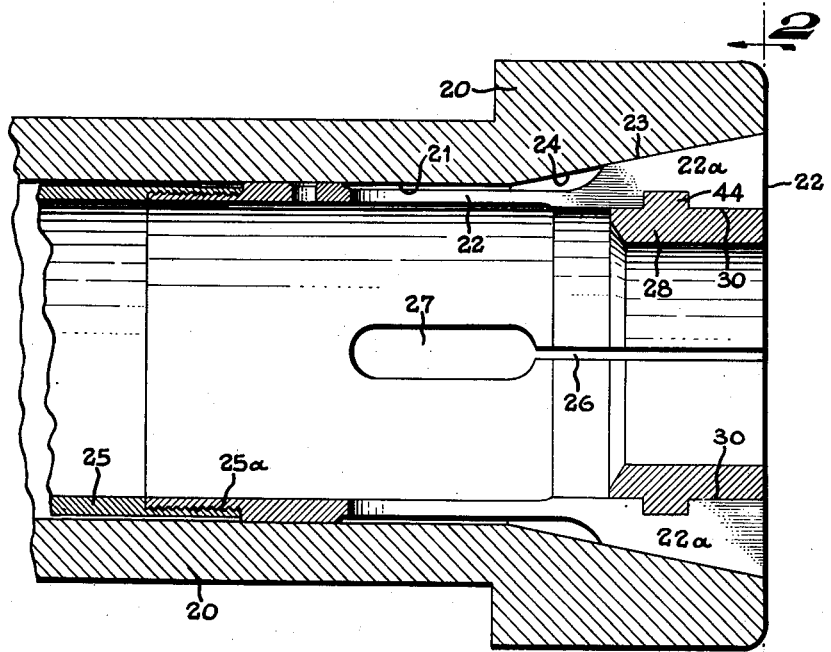
Figure 1 is an enlarged fragmentary longitudinal section through the work spindle, collet, and chuck pads of the improved collet chuck mechanism of applicant's invention.

For exemplary purposes this invention is shown applied to an automatic lathe or screw machine having a work spindle 20, Figure 1, having a bore 21 in which is slidably mounted a collet 22 which in turn has a series of 4 tapered expansible and contractable portions or spring fingers 22a having tapered peripheries 23 which engage the tapered bore 24 of the work spindle 20 in a well known manner and when the collet is axially reciprocated longitudinally of the work spindle by the usual draw tube 25 and associated mechanism not shown. When the collet is moved to the left by the draw tube, Figure 1, the expansible and contractable portions 22a are brought together by the sliding action between the tapered portions 23 and 24, the collet being formed with the usual slots 26 and openings 27 to allow this flexibility of the expansible and contractable end portions 22a. All of the aforedescribed apparatus is of well known and common design and will not be further described herein as it forms no specific part of applicant's present invention.

Figure 3:
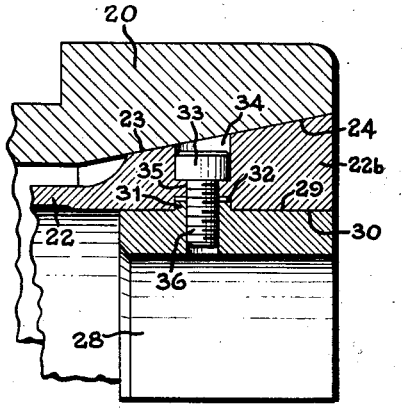
Figure 3 is an enlarged fragmentary view of the work spindle collet and chuck pad showing the arrangement used in former devices which required the axial removal of the collet from the work spindle to change the chuck pads.

Referring particularly to Figure 3, there is shown the former apparatus utilized in which there is provided a series of chuck pads 28 having arcuate surfaces 29 engaging the arcuate surfaces 30 of the expansible and contractable end portions 22b of the conventional type of collet. The chuck pads 28 have the usual tongues 31 which nicely fit in the arcuate slots 32 formed in the bore 30 of the collet. A clamping screw 33 is provided in a counter bore 34 which passes through the bore 35 formed in the collet 22 and is threaded at 36 into the chuck pad 28.

The difficulty with this structure of former designs is that it is necessary to disconnect the collet 22 at the threaded connection 25a from the draw tube 25 and to move it axially completely out of the spindle bore so as to make the clamping screws 33 accessible to release and insert new chuck pads 28. This requirement of former apparatus of this type results in a long time consuming process and great care and skill upon the part of the operator in making the change for different sized chuck pads to accommodate different size pieces of work to be presented in the machine tool. Furthermore, it means exposing the tapered surfaces 23 and 24 between the collet and work spindle to cutting coolant and chips during the change over period of the chuck pads. It also results in loose pieces such as the screws 33 being taken completely out of the collet and thereby possibly being dropped into the machine pan or otherwise lost or misplaced in the change-over operation.

It is these former disadvantages and difficulties which applicant's present structure completely avoids by providing a novel, improved, and simplified structure which is easy to manufacture by which the chuck pads may be released and different sized ones inserted in their place with a minimum of effort and skill and loss of time on the part of the operator.

Figure 2:
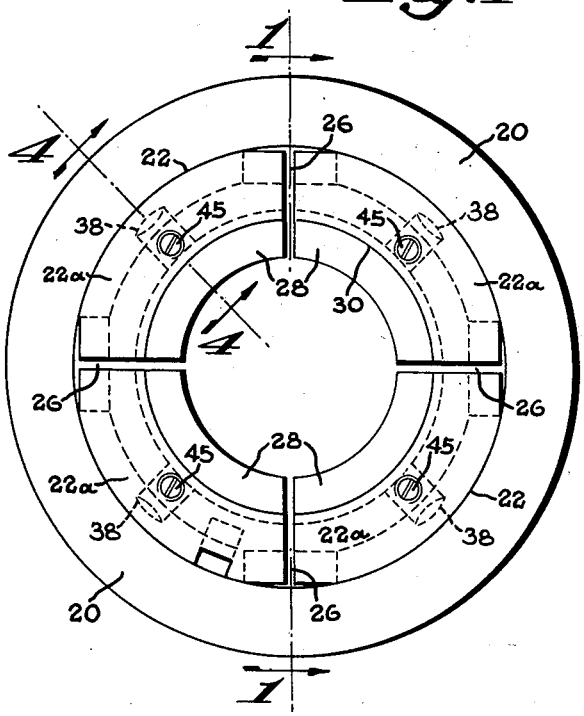
Figure 2 is a front end view of the collet chuck assembly indicated by the line 2—2 in Figure 1.
Figure 4:
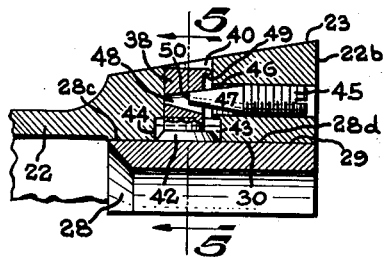
Figure 4 is a fragmentary sectional view on the line 4—4 of Figures 2 and 5.
Figure 5:
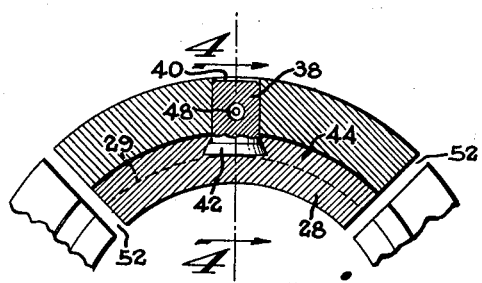
Figure 5 is a sectional view on the line 5—5 of Figure 4.
Figure 6:
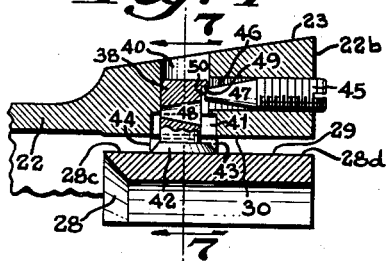
Figure 6 is a sectional view on the line 6—6 of Figure 7.
Figure 7:
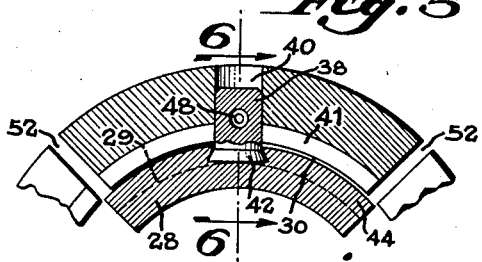
Figure 7 is a sectional view on the line 7—7 of Figure 6.
Figure 12:
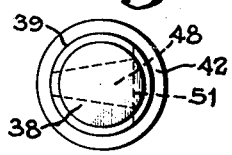
Figure 12 is a plan view of the chuck pin for holding the chuck pad in the collet.
Figures 13, 14:
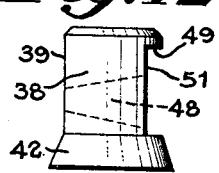
Figure 13 is a side elevation of the chuck pin of Figure 12.
Figure 14 is an end elevation of the chuck pin of Figure 12.
Figure 15:
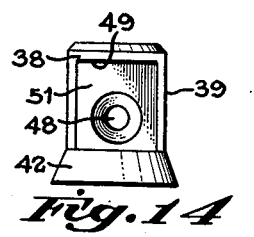
Figure 15 is a view of the chuck pin locking screw.

Applicant's improved chuck pad mounting means is best shown in Figures 2 and 4 wherein there is provided a chuck pin 38 having a cylindrical portion 39, Figures 12, 13 and 14, which nicely slidingly fits in the bore 40 formed radially in each of the spring fingers and members 22a of the collet 22. These bores 40 open into arcuate slots 41 formed in the inner bore 30 of the expansible ends 22a of the collet 22. The inner ends of the chuck pins 38 have formed thereon cylindrical tapered flanges 42 which are adapted to nicely fit in the dovetailed slots 43 formed in the tongues 44 formed on the chuck pads 28, as best seen in Figures 6 and 7.

Chuck pin clamping screws 45 are threadedly fitted at 46 in the ends 22a of the collet so as to project out of the face portion 22b of the collet for accessibility in the application of a socket wrench for rotating the screw 45 without withdrawing the collet 22 from the work spindle 20. The inner ends of these locking screws 45 are formed with conical pointed ends 47 which are adapted to engage in tapered bores 48 formed in the chuck pins 38 when these pins are moved radially to their outward position as shown in Figure 4.

Figure 8:
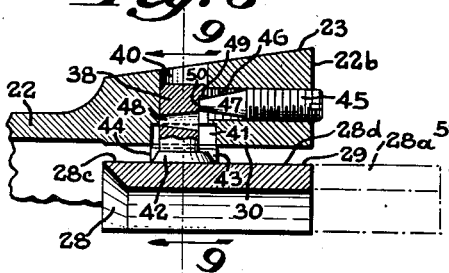
Figure 8 is a fragmentary sectional view on the line 8—8 in Figure 9.
Figure 9:
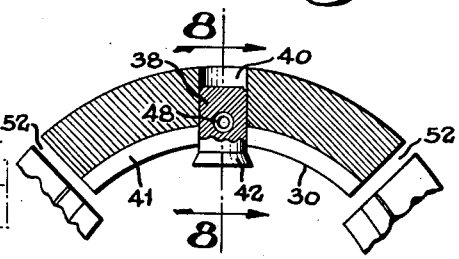
Figure 9 is a sectional view on the line 9—9 of Figure 8.
Figure 10:
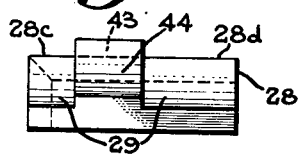
Figure 10 is a side view of one of the chuck pads incorporating the features of applicant's invention.
Figure 11:
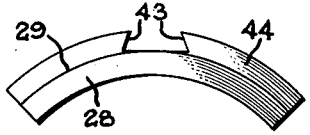
Figure 11 is an end view of the chuck pad shown in Figure 10.

Assuming a chuck pad 28, Figure 4, is locked in operating position and it is to be removed and a new one put in to replace it, the operator first backs off the locking screw 45 until its tapered point 47 is withdrawn from the tapered bore 48 in the chuck pin 38 which allows the chuck pin 38 to drop down or move radially inward together with the chuck pad connected to the chuck pin through the dovetailed slot 43 and the circular tapered flange 42 of the pin 38 until the lip 49 comes into engagement with the tapered end portion 47 of the locking screw 45. The operator then tightens the screw 45 to bring its end portion 50 into engagement with the face 51 on the chuck pin 38 and to thereby securely lock the pin 38 in its inner position as shown in Figure 8. The operator then slides the chuck pad off of the tapered flange portion 42 to the position 28a where it may be readily removed from the collet. It will be noted that sufficient clearance slots 52 are provided between the segments of the spring fingers 22a of the collet and the ends of the arcuate chuck pads so as to allow the pads to be moved radially inward, as shown in Figure 7, and then to be axially withdrawn off of the tapered flange portion 42 of the pins 38.

To replace another chuck pad in the collet the new pad is removed from the position 28a, Figure 8, with its slot 43 engaged over the tapered flange portion 42 of the pin 38. The locking screw 45 is then loosened sufficiently to allow the operator to raise the chuck pad and pin 38 to the position shown in Figure 4 then to tighten the locking screw feeding its tapered end 47 into the tapered bore 48 in the pin 38 and finally tightening the screw 45 down thoroughly to firmly draw the chuck pad against the surface 30 of the collet 22.

This structure is of simple design and easy to manufacture and requires no particularly highly accurate machining of the various parts to make the structure fully operative and accurate in operation. Furthermore, by using the arrangement aforementioned the chuck pins 38 at no time need be removed and dropped from the collet and work spindle during the changing of the pads. This is also true of the clamping screws which need never be moved from the collet but merely loosened and tightened at the appropriate times to effect the change in the chuck pads as described. Furthermore, it is to be clearly noted that by utilizing the circular flange portion 42 engaging in the dovetailed slot 43 the chuck pad is free to rock in a plane passing through the axis of the collet and radially thereof so that when the clamping screw 45 is drawn up tightly, as shown in Figure 4, both of the surfaces 28c and 28d firmly seat themselves on the surface 30 of the collet so that there is no danger of the chuck pads becoming cocked or inaccurately positioned on the spring fingers in clamping them in the collet.

Having thus fully set forth and described this invention, what is claimed as new and desired to be secured by United States Letters Patent is:

1. In a collet chuck assembly having a collet, spring fingers on said collet, and work engaging chuck pads, means for securing said pads to each of said fingers including a chuck pin mounted for radial movement in each finger of said collet, a circular tapered flange on the radially inward portion of said pin, an arcuate tongue formed on said pad, a dovetail slot extending axially of said pad across said tongue adapted to engage said circular tapered flange of said pin whereby radial movement of said pin effects similar radial movement of said pad, and locking screw means adjustable from the front face of said collet for holding said pin against radial movement in said finger.

2. In a collet chuck assembly having a spring finger collet, means engaging said fingers with a tapered bore of a work spindle of a machine containing said collet chuck assembly, and work engaging chuck pads associated with said fingers, means for demountably connecting said pads to said spring fingers comprising radially disposed bores in said fingers, arcuate slots formed in said fingers and intersecting said radially disposed bores, radially movable chuck pins guided in said bores and having cylindrical tapered flange portions received in said arcuate slots, tongues formed on said pads fitting in said arcuate slots, having dovetailed slots formed across said arcuate tongues and engaging over said cylindrical flanged portions of said chuck pins, and locking screw means in said fingers adjustable from the outer face thereof to engage said chuck pins to draw said pads radially outwardly to clamp said pads to said fingers.

3. In a collet chuck assembly having a spring finger collet, means engaging said fingers with a tapered bore of a work spindle of a machine containing said collet chuck assembly, and work engaging chuck pads associated with said fingers, means for demountably connecting said pads to said spring fingers comprising radially disposed bores in said fingers, arcuate slots formed in said fingers and intersecting said radially disposed bores, radially movable chuck pins guided in said bores and having cylindrical tapered flange portions received in said arcuate slots, tongues formed on said pads fitting in said arcuate slots, having dovetailed slots formed across said arcuate tongues and engaging over said cylindrical flanged portions of said chuck pins, a locking screw means in said fingers adjustable from the outer face thereof to engage said chuck pins to draw said pads radially outwardly to clamp said pads to said fingers, means effective upon the release of said locking screw from said chuck pins to limit the radial inward movement of said pins and said pads to a predetermined position to allow axial withdrawal of said pad from engagement of its dovetailed slot from the cylindrical tapered portion of said chuck pin, and further means associated with said locking screw upon further tightening of said screw to lock said chuck pin in said predetermined radially inward position.

ALFRED F. JELINEK.

REFERENCES CITED

The following references are of record in the file of this patent:

UNITED STATES PATENTS

| Number | Name | Date |
| --- | --- | --- |
| 2,159,931 | Montgomery | May 23, 1939 |
| 2,161,939 | Sutton | June 13, 1939 |
| 2,228,337 | Balas | Jan. 14, 1941 |
| 2,261,899 | Bechert | Nov. 4, 1941 |
| 2,291,398 | Martin | July 28, 1942 |